United States Patent
Wells et al.

(10) Patent No.: US 8,180,333 B1
(45) Date of Patent: May 15, 2012

(54) DIFFERENTIAL ROUTING OF COMMUNICATION-USAGE RECORDS

(75) Inventors: Anthony C. Wells, Overland Park, KS (US); Roger Bartlett, Merriam, KS (US); Terry D. Nebergall, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 408 days.

(21) Appl. No.: 12/475,055

(22) Filed: May 29, 2009

(51) Int. Cl.
    *H04M 3/42* (2006.01)
(52) U.S. Cl. ......... 455/415; 455/406; 455/428; 370/218
(58) Field of Classification Search .................. 379/120, 379/142.01–142.18, 245–249; 455/405–408, 455/414.1, 415, 428, 432.1–432.3, 433, 435.1, 455/435.2; 370/216–228; 709/239, 242, 709/244
See application file for complete search history.

(56) References Cited

U.S. PATENT DOCUMENTS

| | | | |
|---|---|---|---|
| 5,670,950 A | 9/1997 | Otsuka | |
| 5,835,856 A | 11/1998 | Patel | |
| 5,852,812 A | 12/1998 | Reeder | |
| 6,097,937 A | 8/2000 | Sawyer | |
| 6,173,171 B1 | 1/2001 | Plush et al. | |
| 6,189,042 B1 | 2/2001 | Keller-Tuberg | |
| 6,259,906 B1 | 7/2001 | Carlsson et al. | |
| 6,282,274 B1 | 8/2001 | Jain et al. | |
| 6,308,267 B1 | 10/2001 | Gremmelmaier | |
| 6,421,714 B1 | 7/2002 | Rai et al. | |
| 6,463,275 B1 | 10/2002 | Deakin | |
| 6,853,630 B1* | 2/2005 | Manning | 370/338 |
| 6,965,914 B2 | 11/2005 | Dowling | |
| 7,272,128 B2 | 9/2007 | Harris et al. | |
| 7,379,999 B1 | 5/2008 | Zhou et al. | |
| 7,454,206 B1 | 11/2008 | Phillips et al. | |
| 2002/0013849 A1 | 1/2002 | Schweitzer et al. | |
| 2002/0087682 A1 | 7/2002 | Roach | |
| 2002/0176378 A1 | 11/2002 | Hamilton et al. | |
| 2002/0191572 A1 | 12/2002 | Weinstein et al. | |
| 2003/0046396 A1 | 3/2003 | Richter et al. | |
| 2003/0060188 A1 | 3/2003 | Gidron et al. | |
| 2003/0074313 A1 | 4/2003 | McConnell et al. | |
| 2003/0126435 A1 | 7/2003 | Mizell et al. | |
| 2003/0236745 A1 | 12/2003 | Hartsell et al. | |

(Continued)

FOREIGN PATENT DOCUMENTS

WO WO 02/073991 9/2002

OTHER PUBLICATIONS

Aboba and Beadles, "The Network Access Identifier," RFC 2486, Network Working Group, Jan. 1999.

(Continued)

*Primary Examiner* — Kent Chang
*Assistant Examiner* — Dinh P Nguyen

(57) ABSTRACT

Disclosed is an apparatus, system, and method for differentially routing communication-usage records based on an identity of the base station that served the underlying communication. For example, if the base station is a home carrier base station, then the communication-usage records may be routed to a particular usage-tracking system, whereas, if the base station is an affiliate carrier base station, then the communication-usage records may be routed to a different usage-tracking system. Further, depending on the base station identity, the routing of the communication-usage records may be delayed or may be more immediate.

22 Claims, 3 Drawing Sheets

U.S. PATENT DOCUMENTS

| | | |
|---|---|---|
| 2004/0192253 A1 | 9/2004 | Usumi |
| 2004/0210524 A1* | 10/2004 | Benenati et al. ............... 705/40 |
| 2004/0267645 A1 | 12/2004 | Pollari |
| 2005/0009500 A1 | 1/2005 | Ear |
| 2005/0169253 A1 | 8/2005 | Hu |
| 2008/0101291 A1* | 5/2008 | Jiang et al. .................. 370/331 |
| 2010/0041365 A1* | 2/2010 | Lott et al. ..................... 455/406 |

OTHER PUBLICATIONS

Rigney, "RADIUS Accounting," RFC 2866, Network Working Group, Jun. 2000.

Rigney et al., "Remote Authentication Dial in User Service (RADIUS)," RFC 2865, Network Working Group, Jun. 2000.

"hp OpenView internet usage manager 4.1 CDMA solution product brief," Hewlet Packard, Aug. 2002.

3rd Generation Parntership Project 2 "3GPPS", "Wireless IP Network Standard," 3GPP2 P.S001-A, Version 3.0, Jul. 16, 2001.

di Flora, "Differentiated Services (DiffServ): Seminar on transport of multimedia streams over the wireless internet," University of Helsinki, appears to be dated Nov. 5, 2003.

Hartanto and Carle, "Policy-Based Billing Architecture for Internet Differentiated Services," Proceedings of IFIP Fifth International Conference on Broadband Communications (BC'99), Hong Kong, Nov. 1999.

U.S. Appl. No. 10/304,475, filed Nov. 25, 2002.

U.S. Appl. No. 10/861,562, filed Jun. 4, 2004.

\* cited by examiner

DIFFERENTIAL ROUTING OF COMMUNICATION-USAGE RECORDS

BACKGROUND

As a general matter, when a cellular wireless carrier provides subscribers with communication service, the carrier will keep track of the extent of subscriber communication, such as the number of minutes of communication or the quantity of data communicated. Maintaining good records of communication usage can facilitate numerous useful functions, including subscriber billing, cost recovery from roaming partners, and evaluation of network resources, among others.

To track communication usage, infrastructure in the carrier's network will typically monitor the extent of usage and generate and send corresponding usage-records to a usage-tracking system for processing. For instance, to track legacy telephone call activity, a switch in the carrier's network may generate a call detail record (CDR) for each call to or from a subscriber and may transmit the CDR to a usage-tracking system. Likewise, to track data communications, a packet-data gateway in the carrier's network may generate usage data records (UDRs) for data communication to or from a subscriber and may transmit the UDRs to an accounting server, which may in turn transmit the UDRs to a usage-tracking system.

For purposes of billing and cost-recovery, the usage-tracking system may sort usage-records based on whether the subscriber at issue is a home subscriber or a roaming subscriber. If the subscriber has a service account with the serving carrier and the communication occurred under that account, then the usage-tracking system would deem the subscriber to be a home subscriber, and the usage-tracking system may process the subscriber's usage-records accordingly, such as by compiling the records and billing or charging the usage to the subscriber's account with the carrier. On the other hand, if the subscriber does not have an account with the serving carrier but instead likely has an account with an affiliate carrier (e.g., a carrier with which the serving carrier has a roaming agreement), then the usage-tracking system may pass the usage-records to an inter-carrier mediation system, which would facilitate recovery of the communication charges from the subscriber's carrier.

OVERVIEW

Particularly with data communications, but perhaps also with legacy voice calls, a carrier's network and usage-tracking infrastructure can become overwhelmed with an abundance of usage-records.

For instance, a packet-data gateway may generate UDRs as data communication passes through the gateway to or from a given subscriber, and the gateway may send those UDRs to an accounting server. The accounting server may then maintain the UDRs in data storage and periodically send the collected UDRs to the usage-tracking system for processing. As subscribers engage in more and more wireless data communication, the number of UDRs that the accounting server needs to maintain in data storage between its transmissions to the usage-tracking system may grow substantially. Further, each UDR may contain a significant amount of information about the data communication. The net result could be a great burden on the storage and processing power of the accounting server. Furthermore, as these UDRs reach the usage-tracking system, the usage-tracking system may itself be burdened as it works to process the abundance of records.

The existence of roaming subscribers may exacerbate this problem, as communication by roaming subscribers will increase the number of UDRs that the accounting server and usage-tracking system need to process, compared with just the UDRs for communication by the carrier's own subscriber. Moreover, processing can be additionally burdened as the usage-tracking system needs to evaluate each subscriber-ID to determine whether the subscriber is a home subscriber or a roaming subscriber, and to then handle the usage-record accordingly.

A further problem can arise in a situation where a carrier makes a portion of its network infrastructure available for use to serve subscribers that are currently served by an affiliate carrier. For instance, an affiliate carrier may operate its own cellular base stations to serve its own subscribers, but the affiliate carrier may have an agreement with a home carrier to make use of the home carrier's switch or packet-data gateway so as to provide the affiliate's subscribers with connectivity to a transport network such as the public switched telephone network (PSTN) or the Internet. With this arrangement, communications to or from the affiliate's subscribers would occur via the base station owned by the affiliate but would pass through the home carrier's switch or gateway. As a result, even though the affiliate's subscribers are served by the affiliate's own base station, the home carrier's switch or gateway would generate usage-records for the communications, and the home carrier's usage-tracking system would process the usage-records, thus further burdening the home carrier's system.

Disclosed herein is an apparatus, system, and method to help deal with this problem in an efficient manner. While the disclosed arrangement and method is applicable in the affiliate scenario described above (where affiliate subscribers communicate through affiliate base station equipment but through the home carrier's switch or gateway or the like), the arrangement and method is not limited to that scenario but is more generally applicable. Nevertheless, the affiliate arrangement will be discussed in the remainder of this document as an example application of the arrangement and method.

In an effort to help ease the burden on the home carrier's system, communication-usage records will be tailored to indicate the identity of the base station through which the wireless communication at issue occurred. An apparatus within the home carrier's system may then use that identity as a basis to automatically determine how to handle the usage-record, and particularly when and where to route the usage-record. If the apparatus determines that the base station has a particular identity, then the apparatus may route the usage-record to a particular usage-tracking system. Whereas, if the apparatus determines that the base station has another identity, then the apparatus may route the usage-record to a different usage-tracking system.

Further, if the apparatus determines that the base station has a particular identity, then the apparatus may store the usage-record among others until a periodic transmission time occurs at which point the apparatus may transmit a set of compiled usage-records to an applicable usage-tracking system for processing. Whereas, if the apparatus determines that the base station has another identity, then the apparatus may avoid burdening itself by holding on to the usage-record but may instead immediately (or at least more quickly) transmit the usage-record to an applicable usage-tracking system.

Optimally, the "identity" of the base station may define an ownership class of the base station, such as (i) ownership by the home carrier or (ii) ownership by an affiliate of the home carrier. Thus, determining the identity of the base station may involve determining the ownership class of the base station. If the apparatus determines that the base station is owned by the home carrier, then the apparatus may route the usage-record to a particular usage-tracking system for processing. Whereas, if the apparatus determines that the base station is not owned by the home carrier, or the apparatus determines that the base station is owned by an affiliate, then the apparatus may route the route the usage-record to a different usage-tracking system.

Further, the usage-tracking system to which the apparatus routes usage-records for communications that occurred through one class of base station (e.g., an affiliate-owned base station) may be a subset or portion of the usage-tracking system to which the apparatus routes usage-records for communications that occurred through another class of base station (e.g., a home carrier owned base station). For instance, if the base station through which the communication occurred is affiliate owned, then the apparatus may route the usage-record directly to an inter-carrier mediation system that is part or, or coupled with, the home carrier's billing system. Whereas, if the base station through which the communication occurred is home carrier owned, then the apparatus may route the usage-record to a front end management system of the home carrier's billing system, and the home carrier's billing system may then process the usage-record through its normal process, e.g., to determine whether the subscriber at issue is a home subscriber or a roaming subscriber, and to then either bill the subscriber (if a home subscriber) or pass the usage-record to the inter-carrier mediation system for processing (if a roaming subscriber).

To facilitate this method, an entity that generates the usage-record may learn the identity of the base station and tailor the usage-record to indicate the identity. To learn the identity, the entity may receive a serving base station identifier (BSID) from the served subscriber device, or the entity may determine the identity based on a trunk connection associated with the base station (e.g., where different base stations have different trunk connections with the entity), for instance. The identity may simply be the BSID. Alternatively, the entity may refer to mapping data to translate the BSID into an identity, such as an ownership class (e.g., affiliate-owned or home carrier owned).

The entity may then include the determined identity in a field of the usage-record. Alternatively, the entity may tailor the data included in the usage-record in a manner that indicates facially (e.g., based on the structure of the usage-record) what the base station identity is, such that an apparatus seeking to determine the base station identity can make the determination based on a review of what fields of data (non-null and non-zero) data are provided by the usage-record, possibly without a need to consider a BSID value if any indicated in the usage-record. For instance, if the communication occurred through an affiliate base station, then the entity generating the usage-record may include in the usage-record merely a specification of the subscriber-ID and a specification of the quantity of communication (among other basic pieces of information), as that information may suffice for inter-carrier settlement of charges. On the other hand, if the communication occurred through a home base station, then the entity generating the usage-record may include one or more additional pieces of information in the usage-record, to assist the home carrier's usage-tracking system in processing the usage-record.

When the usage record is then provided to the apparatus that makes the determination of when and where to route the record, the apparatus can conveniently make its determination based on a review of what fields of data are included in the usage-record. For instance, the apparatus may decide to store and later route the usage-record to a particular usage-tracking system if the usage-record contains a particular set of data fields, as the inclusion of that set of fields (i.e., of data in those fields) indicates that the base station has a particular class (e.g., home carrier owned). Whereas, the apparatus may decide to immediately route the usage-record to a different usage-tracking system if the usage-record contains a different (e.g., minimal) set of data fields, as the inclusion of that set of fields indicates that the base station has a different class (e.g., affiliate owned).

The entity that generates the usage-record may be an entity through which the communication passes, such as a packet-data gateway or a switch for instance. Alternatively, the entity may be an entity involved in signaling related to the communication or otherwise apprised of the communication, such as an accounting server or a service control point, for instance. The apparatus that makes the routing determination based on the base station identity as presently contemplated could then be that same entity or could be another entity. For instance, the apparatus could be an accounting server or a switch.

These as well as other aspects, advantages, and alternatives will become apparent to those of ordinary skill in the art by reading the following detailed description, with reference where appropriate to the accompanying drawings. Further, it should be understood that the description provided throughout, including in this overview section, is intended to characterize the apparatus, method, and system by way of example only, and that numerous variations are possible, including integration, distribution, re-arrangement, re-ordering, omission, or addition of components and functions.

DETAILED DESCRIPTION

Figure 1:
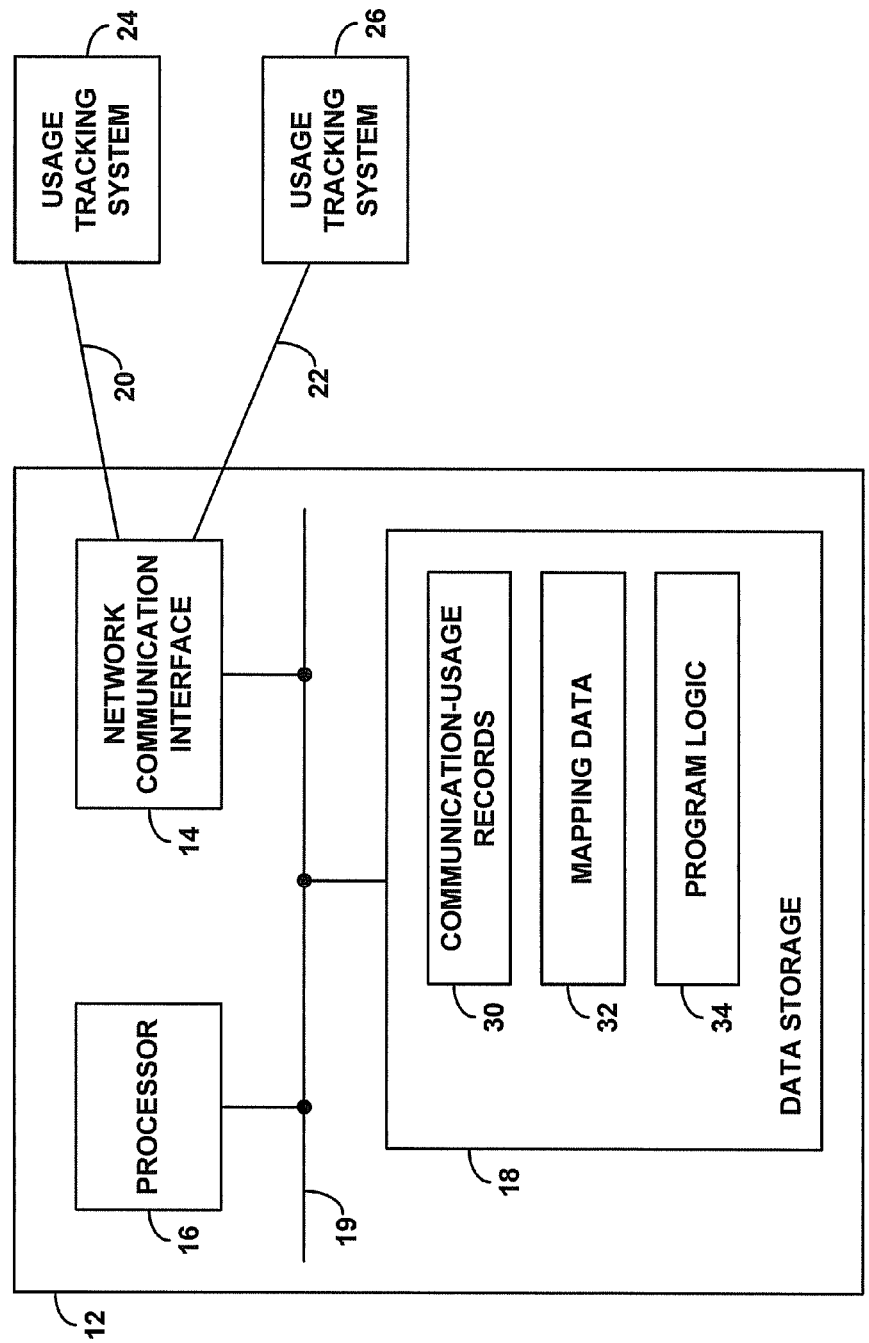
FIG. 1 is a simplified block diagram of an exemplary apparatus arranged to provide differential routing of communication-usage records.

Referring to the drawings, as noted above, FIG. 1 is a generalized block diagram of an example apparatus 12 arranged to differentially route communication-usage records in accordance with base station identity.

As shown, the apparatus includes a network communication interface 14, a processor 16, and data storage 18, among likely other components, coupled together by a system bus or other connection mechanism 19. Although these components are shown as separate blocks on the figure, it should be understood that the components could be integrated together or arranged in various ways. For instance, the network communication interface may be integrated with the processor, such that functions described below as being carried out by the processor would be carried out the network communication interface. Further, while the data storage is shown as a separate block, the data storage could be integrated in whole or in part with the processor and/or the network communication interface. Still further, although the network communication interface is shown as a single block, it could comprise multiple interfaces, possibly of various types. Other variations are possible as well.

As further shown, the network communication interface 14 is arranged to be able to communicate over at least two communication paths 20, 22, each extending to a respective usage-tracking system 24, 26. These communication paths may be circuit or packet based or a combination of circuit and packet based (and may be wired or wireless or a combination of wired and wireless). Further, the communication paths may overlap to some extent. By way of example, each communication path may be a direct trunk connection or other circuit-switched link between the network communication interface 14 and a respective usage-tracking system. As another example, the communication paths 20, 22 may extend over a common packet-switched network on which both of usage-tracking systems 24, 26 reside, in which case the communication paths may pass through the same set of routers and network connections until ultimately reaching the respective usage-tracking system addresses on the network. Other examples are also possible.

Each usage-tracking system preferably resides at a distinct network address (e.g., IP address on a packet-switched network) or otherwise has a distinct connection (e.g., trunk connection) with the apparatus 12. If the usage-tracking systems reside at distinct network addresses, the apparatus is preferably programmed or otherwise provisioned with data indicating the network addresses, so that the apparatus can route data to a selected usage-tracking system by transmitting the data with the usage-tracking system address as the destination address (e.g., as the destination IP address in a packet-based communication to the usage-tracking system. Alternatively, if the usage-tracking system has a distinct connection with the apparatus 12, then the apparatus is preferably programmed or otherwise provisioned with data that indicates which of possibly multiple ports ties with that distinct connection, so that the apparatus can route data to a selected usage-tracking system by transmitting the data via that port and thus onto the appropriate connection.

Accordingly, in practice, the network communication interface may include one or more interfaces suitable for connection with or wired or wireless communication over at least the two communication paths 24, 26 extending respectively to the two usage-tracking systems. These interfaces may take various forms depending on the forms of the communication paths. For instance, the interfaces may comprise a wired Ethernet network interface module for coupling with an Ethernet based connection. As another example, the interfaces may comprise a wireless broadband link such as a WiMAX link for instance, for engaging in wireless communication. Numerous other types of interfaces are possible as well or will be developed in the future.

Processor 16 may comprise one or more general purpose processors (e.g., INTEL microprocessors) and/or one or more special purpose processors (e.g., digital signal processors or application specific integrated circuits). If the processor 16 comprises multiple processors, the multiple processors may be arranged to operate in parallel or in some other manner. Data storage 18, in turn, may comprise one or more volatile and/or non-volatile storage mechanisms, such as magnetic, optical, or organic storage, and, as noted above, may be integrated in whole or in part with processor 16.

As shown, data storage 18 is arranged to hold communication-usage records 30, mapping data 32, and program logic 34, although the mapping data 32 and program logic 34 may be integrated together in the form of program instructions that embody both.

Each communication-usage record 30 defines communication-usage by a given wireless subscriber device, such as a cell phone or wirelessly-equipped computer or other appliance. Examples of communication-usage records as noted above include call detail records (CDRs), typical of legacy voice call communications, and usage data records (UDRs), typical of packet-data communications, but the communication-usage records may take other forms as well.

Preferably, each communication-usage record will indicate the identity (e.g., ownership class) of the base station that served the wireless subscriber device and thus through which the communications at issue passed on their way to or from the wireless subscriber device. For instance, as noted above, each communication-usage record may contain a specification of a base station identifier (BSID), which may uniquely identify the base station or may at least identify a class (ownership class) of the base station. Alternatively, as further noted above, each communication-usage record may indicate the base station identity by containing a set of fields, where the set corresponds with the base station identity.

Furthermore, the communication-usage record will preferably specify an identifier of the wireless subscriber device that engaged in the communication at issue, such as a mobile identification number (MIN), international mobile subscriber identifier (IMSI), network access identifier (NAI), or other identifier. And the communication-usage record will specify the extent of the communication that occurred via the base station serving that wireless subscriber device. For instance, for time-based communication, the communication-usage record may specify a number of minutes of communication, and for data-based communication, the communication-usage record may specify a quantity of data communication (such as number of bytes communicated to or from the subscriber).

Mapping data 32 includes data that correlates particular base station identities with particular usage-tracking systems, and is usable by the apparatus to select a usage-tracking system to which the apparatus should send a particular communication-usage record depending on the identity of the base station through which the communication at issue passed. The mapping data may be a simple table that correlates base station identities (e.g., BSIDs or classes (e.g., indicated by field-set of the usage-record)) with network addresses and/or path ports of particular usage-tracking systems. Or the mapping data may be a more complex relational database structure defining these and other correlations.

The correlations may be one-to-one. Alternatively, the correlations may be one-to-many. For instance, each base station identity may have its own corresponding usage-tracking system, or a given usage-tracking system may correspond with multiple base station identities. As an example of the latter, one usage-tracking system may correlate with all home carrier owned base stations, while another usage-tracking system may correlate with all affiliate owned base stations. Thus, the home carrier may operate a primary usage-tracking system to which all communication-usage records are sent for communications served by the carrier's own base stations, whereas the home carrier may operate a separate usage-tracking system (or some subset of the primary usage-tracking system) to which all communication-usage records are sent for communications served by affiliate carries' base stations.

Although only two usage-tracking systems and corresponding communication paths are shown in FIG. 1, it is of course possible that more than two usage-tracking systems and corresponding communication paths could be provided. Further, as noted above, one of the usage-tracking systems could be a subset of another one of the usage-tracking systems. Advantageously by discretely designating and addressing the usage-tracking systems in that scenario, it is possible to route communication-usage records more directly to the sub-system when desired without having the communication-usage records pass through and be processed by a front end or other aspects of the main system.

In an example implementation, usage-tracking system 20 may be a composite usage-tracking system and may be operated by the carrier that operates the apparatus 12. The composite usage-tracking system 20 may include a front-end management system that sits at a particular network address to which the apparatus 12 can send communication-usage records destined to that usage-tracking system 20. The front-end management system may then couple with one or more other components of the usage-tracking system 20, and any one or more aspect of the usage-tracking system may include logic to segregate communication-usage records based on subscriber-ID, so as to process home subscriber usage-records in one way and to pass roaming subscriber usage-records to an inter-carrier mediation system. Usage-tracking system 22 may then be the inter-carrier mediation system itself or some associated component that may or may not be part of usage-tracking system 20, and usage-tracking system 22 preferably sits at its own specific network address to which apparatus 12 can send communication-usage records destined to usage-tracking system 22.

Figure 2:
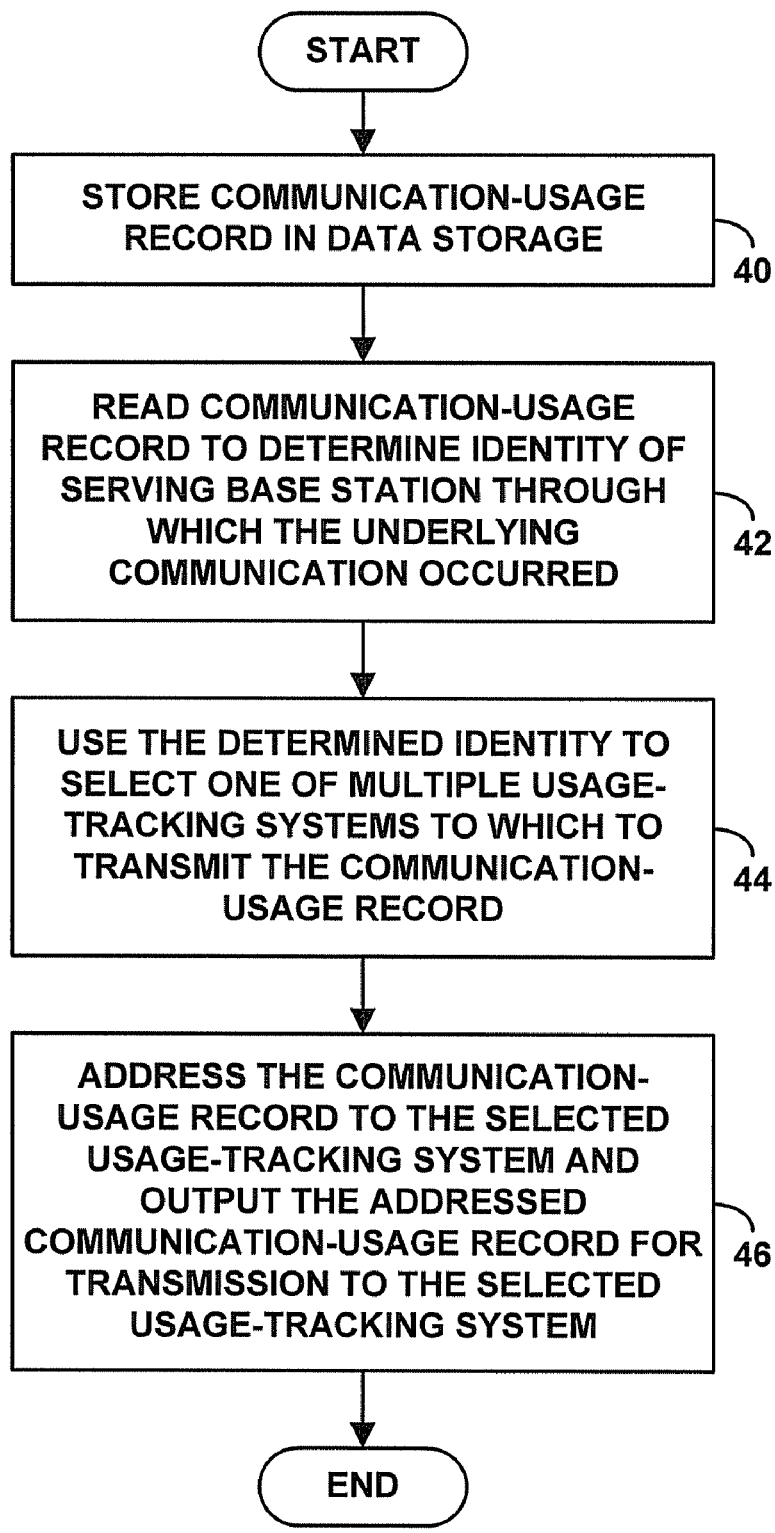
FIG. 2 is a flow chart depicting functions that can be carried out in accordance with an exemplary method.

Program logic 34 preferably comprises machine language instructions executable by processor 16 to implement various functions described herein. Turning briefly to FIG. 2, a flow chart is provided to help illustrate some of those functions.

As shown in FIG. 2, at block 40, the flow includes storing in data storage 18 a communication-usage record 30 that species an extent of communication by a wireless subscriber device (also referred to as a wireless communication device (WCD)), where that communication occurred via a base station that serves the WCD. The act of storing the communication-usage record may involve the processor depositing or saving the communication-usage record to the data storage 18. Alternatively, the communication-usage record may already reside in data storage, and thus be stored there.

At block 42, the flow then includes executing machine language instructions to read the communication-usage record so as to determine an identity of the base station. (This should be construed as machine-implementation, as only a machine could execute machine language instructions.) For instance, the processor may read the communication-usage record to extract from the record a BSID that uniquely identifies the base station or that identifies a class (e.g. ownership) of the base station. Alternatively, the processor may read the communication-usage record to determine the set of data fields included in the record and may consider the set of fields to be indicative of the base station identity as discussed above. Other ways to implement this function are possible as well.

At block 44, the flow then includes using the determined identity as a basis to select one of multiple usage-tracking systems to which to transmit the communication-usage record. The processor may use the mapping data 32 as described above for this purpose. In particular, the processor may refer to the mapping data to determine the usage-tracking system address or connected port that correlates with the determined base station identity.

This determination may be based generally on an identifier of the base station, such that if the base station has a particular identifier, the processor would select a particular usage-tracking system, whereas if the base station has another identifier, the processor would select a different usage-tracking system. Alternatively, this determination may be based on class of base station, such as base station type or, most preferably, ownership class, which may be indicated by the base station identifier. Thus, if the processor determines that the base station has a particular ownership class (e.g., that the base station is owned by the carrier that owns the apparatus making the determination), then the processor may select a particular usage-tracking system, whereas if the processor determines that the base station has a different ownership class (e.g., that the base station is not owned by the carrier that owns the apparatus making the determination, or that the base station is owned by a particular other carrier or entity, such as an affiliate carrier for instance), then the processor may select a different usage-tracking system. Other distinctions in usage-tracking system selection may be made based on base station identity as well.

At block 46, the flow then includes addressing the communication-usage record to the selected usage-tracking system and outputting the addressed communication usage-record via the network communication interface 14 to transmit the communication-usage record to the selected usage-tracking system. Thus, in operation, the communication-usage record may be transmitted to usage-tracking system 20 if the determined identity of the base station is a particular identity (e.g., if the identity is that the base station is owned by the home carrier whose apparatus 12 is making the determination), whereas the communication-usage record may be transmitted to usage-tracking system 22 if the determined identity of the base station is another identity (e.g., if the identity is that the base station is not owned by the home carrier, or that the base station is owned by a particular affiliate or other entity).

In outputting the communication-usage record for transmission to the selected usage-tracking system, the processor may also distinguish output timing based on the base station identity. For instance, if the processor determines that the base station has a particular identity (e.g., home carrier owned), then the processor may hold the communication-usage record in data storage 18 until a next periodic transmission to the usage-tracking system, at which time the processor may then output for transmission the communication usage-record as well as any and all other communication-usage records that the processor has held until the periodic transmission. On the other hand, if the processor determines that the base station has a different identity (e.g., not home carrier owned, or affiliate-carrier owned), then the processor may immediately (or at least more immediately) transmit the communication-usage record to the selected usage-tracking system, to avoid additionally burdening the data storage of the apparatus.

Apparatus 12 can be implemented as a discrete entity arranged to serve the functions described herein. Alternatively, apparatus 12 can be implemented functionally in another network entity.

For instance, apparatus 12 may take the form of an authentication, authorization, and accounting (AAA) server of a type generally well known in the art, which may receive communication-usage records in the form of UDRs from a packet-data gateway such as a packet data serving node (PDSN) for instance. Thus, the communication-usage records 30 shown in data storage 18 may comprise the communication-usage records that apparatus 12 receives from one or more PDSNs or other entities. Alternatively or additionally, the communication-usage records 30 may comprise composite usage-records generated by apparatus 12 or another entity by rolling up multiple received communication-usage records.

Alternatively, apparatus 12 may take the form of a packet-data gateway itself through which the wireless subscriber's data communications pass. In that case, the apparatus 12 may itself generate and store in its data storage some or all of the communication-usage records, though even then the apparatus 12 may receive the communication-usage records from another entity. Still alternatively, apparatus 12 may take the form of a mobile switching center (MSC), in which case the apparatus 12 may likewise generate and store some or all of the communication-usage records itself, perhaps in the form of CDRs.

In the event apparatus 12 receives communication-usage records from one or more other entities, the apparatus may receive those communication-usage records via its network communication interface 14 or via another communication interface (not shown). For instance, if network communication interface 14 provides connectivity with a packet-switched network defining communication paths 20, 22, apparatus 12 may receive the communication-usage records via the packet-switched network from another entity situated on the network.

Figure 3:
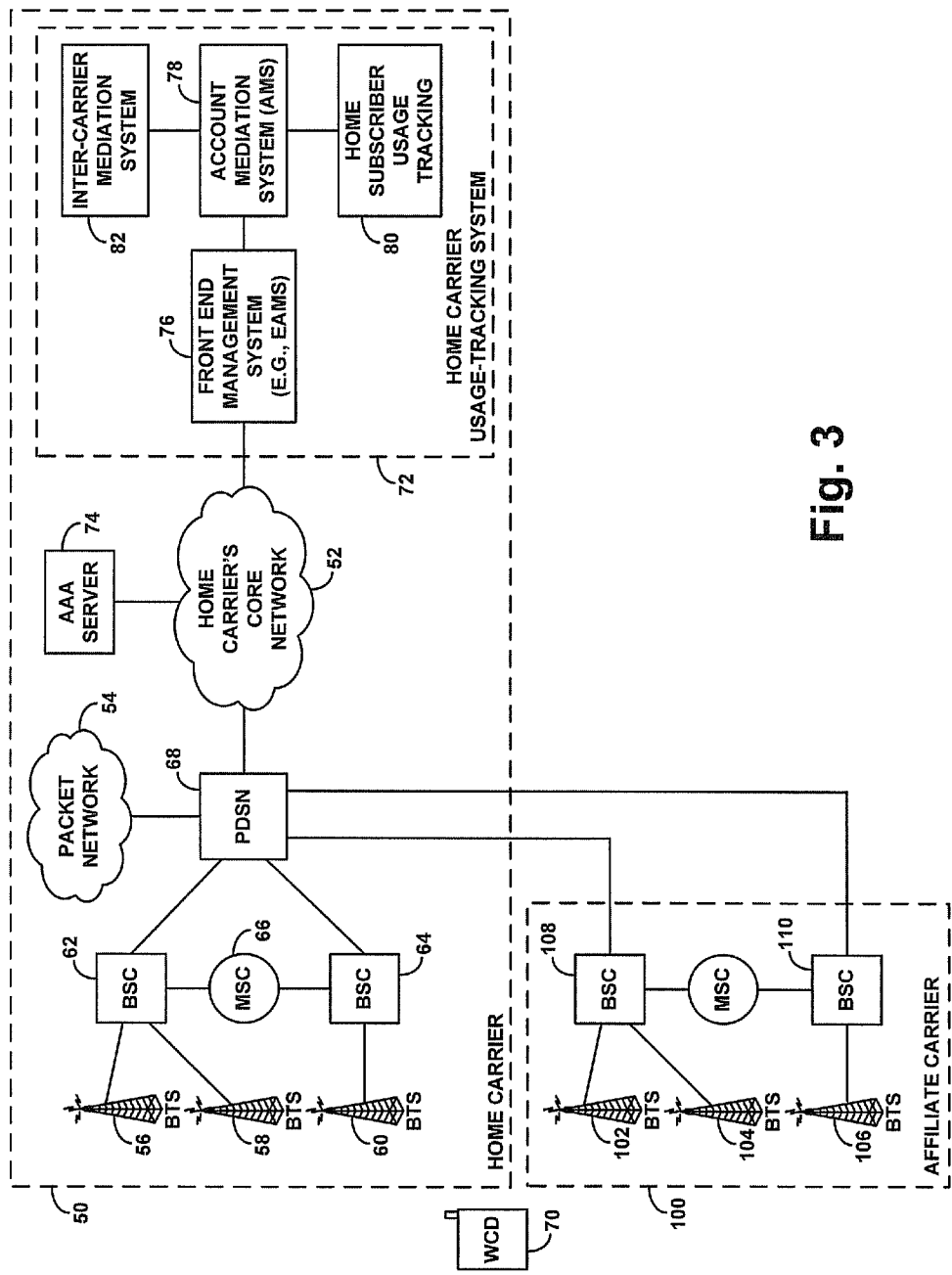
FIG. 3 is a simplified block diagram of a system in which differential routing of communication-usage records can be implemented.

FIG. 3 is a simplified block diagram of a system in which the exemplary apparatus and method can be implemented with respect to data communications. As shown in the top portion of FIG. 3, the system includes a home carrier network 50. The home carrier network 50 includes a home carrier core network 52, such as an ATM and/or IP-based network. Connected with the core network 52 (e.g., sitting on the core network) is then various radio access network (RAN) equipment, which allows subscribers to engage in wireless data communications such as web browsing, voice-over-IP communication, e-mail communication, or others, via a packet-switched network 54 such as the Internet for instance and/or via the core network 52.

The RAN equipment includes one or more base transceiver stations (BTSs) 56, 58, 60, each of which comprises an antenna arrangement and associated equipment to define one or more wireless coverage areas in which wireless subscriber devices can operate. Further, the RAN equipment includes one or more base station controllers (BSCs) 62, 64, each of which functions to control one or more of the BTSs, such as to control power of transmissions over the air and to control handoffs of subscriber devices as the devices move between wireless coverage areas. (For purposes of the present discussion, a "base station" can be a BTS, a BSC, a combination of a BTS and a BSC, or any other base station apparatus or system. As such, other systems may use names other than "BTS" and "BSC" for similar entities, but functionally the entities may still be considered base stations or parts of base stations.) In addition, the RAN equipment includes one or more mobile switching centers (MSCs) 66, each of which is coupled with one or more of the BSCs, and which may provide connectivity with a circuit-switched transport network such as the public switched telephone network (PSTN) for instance. Of course, the RAN equipment could take other forms as well, ranging from far less complex than this to far more complex than this.

To facilitate wireless packet-data communication by subscriber devices, the home carrier network 50 preferably also includes a gateway or network access server of some sort, such as a packet data serving node (PDSN) 68. Together with RAN infrastructure such as a BTS and BSC for instance, the PDSN provides connectivity between one or more wireless subscriber devices and one or more transport networks such as networks 52, 54 for instance. Further, PDSN 68 may function as a mobile-IP foreign agent and/or as a dynamic host control protocol (DHCP) server, to facilitate assignment of IP addresses to wireless subscriber devices.

In practice, PDSN 68 may receive requests from subscriber stations to engage in data communication and may responsively grant those requests, and data communication to and from the subscriber stations may then pass through the PDSN. For example, a wireless communication device (WCD) 70 within the coverage of BTS 60 may seek to establish wireless packet-data connectivity by sending a connection or origination request over the air to the BTS and in turn to BSC 64. After possible signaling with MSC 66, BSC 64 may then assign air-interface traffic channel resources for use by the WCD to engage in wireless bearer-traffic communication, and BSC 64 may signal to PDSN 68. PDSN 68 may then negotiate with WCD 70 to establish a data-link layer connection, and the PDSN or a mobile-IP home agent (not shown) may assign an IP address for the WCD 70 to use in communications on the transport network 54. Packet-data communications to and from the WCD 70 may then flow through the PDSN 68.

Also connected with the core network 52 is a usage-tracking system 72, which may be a billing system or other type of system arranged to track communication by wireless subscriber devices. In addition, sitting on the core network is an authentication, authorization and accounting (AAA) server 74, which may function to pass usage information to the usage-tracking system 72 to facilitate usage-tracking (e.g., billing), as will also be described more below.

In normal practice, PDSN 68 will also track and report subscriber usage, to facilitate billing and performance monitoring for instance. To do so, for each data session that passes through the PDSN, the PDSN may generate and send Usage Data Records (UDRs) to the AAA server 74. More particularly, at the start of the session, the PDSN may send a START UDR, at the end of the session, the PDSN may send a STOP UDR, and periodically during the session, the PDSN may send other UDRs. Each UDR may be compliant with the RADIUS (Remote Authentication Dial In User Service) protocol, for instance, and may provide information such as a session ID, a subscriber ID, the subscriber's assigned IP address, and the number of bytes of data communicated so far during the session. Each UDR is typically formatted as a database record with predefined fields.

The PDSN may be programmed to record data quantities in each UDR with various increments and with a desired level of accuracy. For instance, the PDSN could be programmed to record the quantity of data communicated as a number of bytes or a number of kilobytes. As another example, the PDSN could be programmed to round data quantity to the nearest whole byte or kilobyte and to record that whole increment count in the UDR. Further, the PDSN may be programmed to record a special data quantity for particular sessions. For instance, the PDSN could be programmed to record a quantity of zero increments of data for sessions of a certain type, such as data sessions between one of the carrier's subscriber's and the carrier's customer service system or between a subscriber and one or more other designated network entities, or for sessions that experienced system disconnects. Other examples are possible as well.

As the AAA server 74 receives UDRs, the AAA server may store the UDRs in its data storage. Periodically, or in response to another triggering event (such as a request from the usage-tracking system 72), the AAA server may then programmatically send to the usage-tracking system 72 the UDRs that it has received. Based on the UDRs, subscriber service plans, and perhaps other data, the usage-tracking system 72 may then compute and apply charges to subscriber accounts. On a recurring basis, such as every month, every other month, or quarterly, for instance, the usage-tracking system may then generate subscriber invoices and send the invoices to subscribers for payment.

Usage-tracking system 62 can take various forms. In a preferred embodiment, the usage-tracking system 124 may comprise a number of subsystems, each of which could take the form of one or more programmed computers (e.g., computers with microprocessors and data storage (e.g., one or more volatile or non-volatile storage media, in one or more computers or other devices), and with machine language instructions (program logic) stored in the data storage and executable by the microprocessors) sitting at a defined network address, and all of which could reside on a local area network or could be connected together in some other way. As shown by way of example in FIG. 3, the subsystems may include a front end management system 76 such as an enhanced accounting management system (EAMS) for instance, an account mediation system (AMS) 78, a subscriber usage tracking system 80, and an inter-carrier mediation system 82.

The front end management system 76 may function to aggregate UDRs from one or more AAA servers, on a session-by-session basis. This can be important in a mobile communication system, where subscriber stations move from access network to access network during the course of a given session, since in that case multiple AAA servers may provide UDRs for a common session. For each session, the front end management system 76 may periodically generate and send to the AMS 78 an IP Data Record (IPDR) that specifies a session ID, a subscriber ID, and the quantity of data communicated so far in the session.

The AMS 78 in turn may function to aggregate IPDRs that it receives from the front end management system 76. For instance, for each session, the AMS 78 may periodically generate an incremental IPDR that specifies a session ID, a subscriber ID, and the quantity of data communicated since the last IPDR that the AMS 78 generated. Further, the AMS 78 may send those IPDRs to the home subscriber usage tracking subsystem 80, which may determine from the IPDR the quantity of data communicated so far in the session and may record that data quantity into the appropriate subscriber account.

AMS 78 may further function to determine from the subscriber-ID in each UDR or IPDR whether the subscriber at issue is a subscriber of the home carrier or is rather a roaming subscriber currently operating in the home carrier's network. The AMS may make this determination by reference to subscriber-ID mapping data. If the AMS determines that the subscriber is a home subscriber, then the AMS may provide the usage data to the home subscriber usage tracking system 80 as noted above. Alternatively, if the AMS determines that the subscriber is a roaming subscriber, then the AMS may provide the usage data to the inter-carrier mediation system 82, which may function to pass the usage data along to the appropriate carrier to facilitate settlement of the charges between the carriers.

Shown further in FIG. 3 is an affiliate carrier system 100, which includes certain RAN equipment for serving its own subscribers but which is connected with the home carrier's system 50 so as to make use of aspects of the home carrier's system. In particular, as shown by way of example, the affiliate carrier system 100 may include a number of BTSs 102, 104, 106, coupled with a number of BSCs 108, 110, and each BSC is then communicatively linked (e.g., by one or more suitable trunks) with the home carrier's PDSN. In this way, the affiliate carrier can provide wireless communication service to its own subscribers (or for that matter roaming subscribers) served by its own base stations, and the packet-data traffic to and from those subscribers can flow through the home carrier's PDSN, thus enabling the affiliate subscribers to engage in wireless packet data communication.

Although FIG. 3 shows the BTSs of the affiliate carrier separately from the BTSs of the home carrier, it is possible that as home carrier BTS and affiliate carrier BTS can be co-located, such as employing a common antenna tower for instance. Further, although separate home and affiliate BSCs are shown, it is possible that the affiliate carrier could make use of the home carrier's BSCs rather than providing its own. Other variations are possible as well.

In accordance with the present method, AAA server 74 (functioning as apparatus 12) may be arranged to dynamically route UDRs based on the identity of the base station that served the WCD and thus through which the underlying wireless communication passed, such as based on whether the serving BTS is a home carrier BTS or an affiliate carrier BTS. To facilitate this in practice, the PDSN 68 may be programmed to include in each UDR that it creates a specification of the base station identity, and the AAA server may refer to that specification as a basis to make the routing determination.

The PDSN 68 can learn the identity of the serving base station in various ways. By way of example, when the WCD 70 negotiates with the PDSN 68 to establish a data-link layer connection, the WCD may convey in its signaling to the PDSN 68 a specification of the base station identity, such as a BSID that the WCD received when registering with the base station or that was wirelessly broadcast in an overhead message from the base station. The BSID may uniquely identify the base station as compared with all other base stations. Alternatively, the BSID may identify a class of the base station, such as an ownership class for instance. By way of example, the BSID may include or be a Boolean flag that would have one value to indicate ownership of the base station by the home carrier and another value to indicate ownership of the base station by an affiliate carrier. Alternatively, it may be the case that only home carrier base stations would have or provide relevant identifiers, in which case the PDSN may interpret the lack of such an identifier as being akin to an identifier of a non-home carrier base station. In any event, the PDSN may then record the determined identity in its data storage in connection with a session ID, subscriber ID or the like, so that the PDSN may tailor each UDR to indicate the identity.

The PDSN may tailor a UDR to indicate the identity of the serving base station through which the communication at issue passed by specifying the identity as data in the UDR. Alternatively, the PDSN may tailor the UDR to indicate the identity by including a specific set of fields of non-zero and non-null data in the UDR in correspondence with the base station identity. For instance, if the base station is a home carrier base station, the PDSN may include data in a particular field, whereas if the base station is an affiliate base station, the PDSN may exclude that data in that particular field (e.g., may exclude the field). The existence or absence of that field of data in the UDR may thereby indicate the identity of the base station.

As the AAA server 74 receives a UDR from the PDSN 68 (or when the AAA server is going to output a UDR), the AAA server may thus determine the base station identity, such as by reading a base station identifier from the UDR or by programmatically evaluating the set of fields of data in the UDR. Based on the determined base station identity, the AAA server may then determine whether to hold the UDR until a next periodic transmission or to more immediately output the UDR. Further, based on the determined base station identity, the AAA server preferably selects a usage-tracking system to which to send the UDR.

Two example usage-tracking systems are shown in FIG. 3. One system is the home carrier's usage-tracking system 72. The other system is the inter-carrier mediation system 82, which is shown as a component of the home carrier's usage-tracking system 72 but could just as well be an external component. Each of these usage-tracking systems is accessible at an address on the home carrier's core network 52. In particular, the home carrier's usage-tracking system may be accessed at a network address of its front end management system 76, whereas the inter-carrier mediation system 82 may be accessed at a different network address.

In practice, when the AAA server determines that the serving base station through which the underlying communication passed is a home base station, then the AAA server may automatically route the UDR at issue to the front end management system 76 of the home carrier's usage-tracking system. Whereas, if the AAA server determines that the serving base station is an affiliate base station, then the AAA server may instead automatically route the UDR at issue to the inter-carrier mediation system 82, to facilitate settlement of the communication charges with the affiliate carrier.

Thus, if WCD 70 engages in data communication via a base station of the home carrier, UDRs for that communication would be routed automatically to the front end management system of the home carrier's usage-tracking system for processing. Whereas, if the WCD 70 engages in data communication via a base station of an affiliate carrier, UDRs for that communication would be routed automatically to the inter-carrier mediation system, advantageously avoiding the need for those records to pass through and be processed by the front end management system 76 on the way.

Although the discussion above primarily focuses on data communications, it should be understood that the same functional arrangement can be implemented for legacy voice communication. For instance, if an MSC of the home carrier functions to serve not only home carrier base stations but also affiliate or other carrier base stations, the MSC may dynamically route CDRs to usage-tracking systems based on the identities of the serving base stations. For that matter as well, a mobile-IP home agent or still other entities could carry out the innovative dynamic routing functionality.

An exemplary embodiment of the present invention has been described above. Those skilled in the art will understand, however, that changes and modifications may be made to the embodiment described without departing from the true scope and spirit of the invention, which is defined by the claims.

What is claimed is:

1. An apparatus arranged to differentially route communication-usage records, the apparatus comprising:
    a network communication interface;
    a processor; and
    data storage,
    wherein the data storage contains a communication-usage record specifying an extent of communication by a wireless communication device (WCD), wherein the communication occurred via a base station serving the WCD, and
    wherein the processor determines an identity of the base station and uses the determined identity as a basis to select one of a plurality of usage-tracking systems to which to transmit the communication-usage record via the network communication interface, such that (i) the processor transmits the communication-usage record to a first usage-tracking system via the network communication interface if the processor determines that the base station has a first identity and (ii) the processor transmits the communication-usage record to a second usage-tracking system via the network communication interface if the processor determines that the base station has a second identity.

2. The apparatus of claim 1, wherein the base station comprises a base transceiver station.

3. The apparatus of claim 1, wherein the processor determines the identity of the base station by mapping an identifier of the base station to a base station ownership class, wherein the first identity is a first ownership class and the second identity is a second ownership class, and so the processor transmits the communication-usage record to the first usage-tracking system if the processor determines that the base station has the first ownership class, and wherein the processor transmits the communication-usage record to the second usage-tracking system if the processor determines that the base station has the second ownership class.

4. The apparatus of claim 3, wherein the first ownership class is ownership by an entity that also owns the apparatus, and wherein the second ownership class is ownership by an entity that does not also own the apparatus.

5. The apparatus of claim 3, wherein the first ownership class is ownership by a wireless service provider that also owns the apparatus, and wherein the second ownership class is ownership by an affiliate of the wireless service provider.

6. The apparatus of claim 1, wherein the apparatus is an authentication, authorization, and accounting (AAA) server.

7. The apparatus of claim 1,
    wherein the first usage-tracking system is a composite usage-tracking system comprising at least one front end management system, and wherein the second usage-tracking system is an inter-carrier mediation system arranged to mediate usage-records between wireless service providers,
    wherein in transmitting the communication-usage record to the first usage-tracking system, the processor transmits the communication-usage record to the front end management system of the composite usage-tracking usage system for processing, and
    wherein in transmitting the communication-usage record to the second usage-tracking system, the processor transmits the communication-usage record to the inter-carrier mediation system without the communication-usage record passing through the front end management system in transit from the apparatus to the inter-carrier mediation system.

8. The apparatus of claim 1, wherein the apparatus is a packet data serving node (PDSN).

9. The apparatus of claim 1, wherein the apparatus is a mobile switching center (MSC).

10. The apparatus of claim 1, wherein the network communication interface comprises:
    a first interface connected with a first communication path extending to the first usage-tracking system; and
    a second interface connected with a second communication path extending to the second usage-tracking system.

11. The apparatus of claim 1, wherein the apparatus generates the communication-usage record.

12. The apparatus of claim 1, wherein the apparatus receives the communication usage record from an entity that generates the communication-usage record.

13. The apparatus of claim 1, wherein the communication-usage record contains an identifier of the base station, and wherein the processor determines the identity of the base station by referring to the identifier in the communication-usage record.

14. The apparatus of claim 1,
    wherein the communication-usage record contains non-zero and non-null data values of a particular set of fields, and wherein the processor determines the identity of the base station by determining which set of fields of data values the communication-usage record contains, and wherein the processor determines that the base station has the first identity in response to determining the communication-usage record contains data values of a first set of fields, and wherein the processor determines that the base station has the second identity in response to determining that the communication-usage record contains data values of a second set of fields.

15. The apparatus of claim 1, wherein if the processor determines that the base station has the first identity, then the processor holds the communication-usage record in the data storage until a periodic reporting point at which the processor transmits the communication-usage record together with one or more other communication-usage records to the first usage-tracking system, and wherein if the processor determines that the base station has the second identity, then the processor transmits the communication-usage record to the second usage-tracking system without waiting for a periodic reporting point and without transmitting the communication-usage record with one or more other communication-usage records.

16. A system comprising:

a packet data serving node (PDSN);

an authentication, authorization, and accounting (AAA) server;

a first usage-tracking system; and a second usage-tracking system, wherein the PDSN generates a communication-usage record specifying an extent of communication by a wireless communication device (WCD) served by the PDSN, wherein the communication occurred via a base station serving the WCD, and wherein the PDSN includes in the generated communication-usage record an identifier of the base station, wherein the PDSN transmits the generated communication-usage record to the AAA server, wherein the AAA server receives the communication-usage record and selects a destination for the communication-usage record based on the base station identifier in the received communication-usage record, wherein the AAA is arranged to select the first usage-tracking system as the destination if the base station identifier has a first class, and the AAA server is arranged to select the second usage-tracking system as the destination if the base station identifier has a second class, and wherein the AAA server transmits the usage-tracking record to the selected destination.

17. The system of claim 1, wherein the base station comprises a base transceiver station.

18. The system of claim 16, wherein the first usage-tracking system is a composite usage-tracking system comprising at least one front end management system, and wherein the second usage-tracking system is an inter-carrier mediation system arranged to mediate usage-records between wireless service providers, wherein when transmitting the communication-usage record to the first usage-tracking system, the AAA server transmits the communication-usage record to the front end management system of the composite usage-tracking usage system for processing, and wherein when transmitting the communication-usage record to the second usage-tracking system, the AAA server transmits the communication-usage record to the inter-carrier mediation system without the communication-usage record passing through the front end management system in transit from the AAA server to the inter-carrier mediation system.

19. The system of claim 18, wherein the first class is ownership by a wireless service provider that also owns the AAA server, and wherein the second class is ownership by a wireless service provider that does not also own the AAA server.

20. A method comprising:

storing in data storage a communication-usage record that specifies an extent of communication by a wireless communication device (WCD), wherein the communication occurred via a base station serving the WCD, and executing machine language instructions to read the communication-usage record so as to determine an identity of the base station;

using the determined identity as a basis to select one of a plurality of usage-tracking systems to which to transmit the communication-usage record;

addressing the communication-usage record to the selected usage-tracking system and outputting the addressed communication-usage record via a network communication interface to transmit the communication-usage record to the selected usage-tracking system, so that the communication-usage record is transmitted to a first usage-tracking system if the determined identity is a first identity but the communication-usage record is transmitted to a second usage-tracking system if the determined identity is a second identity.

21. The method of claim 20 implemented by an authentication, authorization, and accounting (AAA) server, wherein the first usage-tracking system is a composite usage-tracking system comprising at least one front end management system, and wherein the second usage-tracking system is an inter-carrier mediation system arranged to mediate usage-records between wireless service providers, wherein if the communication-usage record is transmitted to the first usage-tracking system, the AAA server transmits the communication-usage record to the front end management system of the composite usage-tracking usage system for processing, and wherein if the communication-usage record is transmitted to the second usage-tracking system, the AAA server transmits the communication-usage record to the inter-carrier mediation system without the communication-usage record passing through the front end management system in transit from the AAA server to the inter-carrier mediation system.

22. The method of claim 20, wherein using the determined identity as a basis to select one of a plurality of usage-tracking systems to which to transmit the communication-usage record comprises:

executing machine language instructions to make a determination based on the identity of whether the base station has a first ownership class or a second ownership class;

if the determination is that the base station has the first ownership class, then selecting the first usage-tracking system as the usage-tracking system to which to transmit the communication-usage record; and if the determination is that the base station has the second ownership class, then selecting the second usage-tracking system as the usage-tracking system to which to transmit the communication-usage record.

* * * * *